United States Patent
Orejas et al.

(10) Patent No.: US 10,663,600 B2
(45) Date of Patent: May 26, 2020

(54) REDUCING FREQUENCY SEARCH SPACE FOR GLOBAL NAVIGATION SATELLITE SYSTEM ACQUISTION

(71) Applicant: Honeywell International Inc., Morris Plains, NJ (US)

(72) Inventors: Martin Orejas, Brno (CZ); Jakub Skalicky, Brno (CZ); Tomas Hynek, Kutna Hora (CZ)

(73) Assignee: Honeywell International Inc., Morris Plains, NJ (US)

(*) Notice: Subject to any disclaimer, the term of this patent is extended or adjusted under 35 U.S.C. 154(b) by 296 days.

(21) Appl. No.: 15/624,569

(22) Filed: Jun. 15, 2017

(65) Prior Publication Data

US 2018/0364364 A1    Dec. 20, 2018

(51) Int. Cl.
*G01S 19/29* (2010.01)
*G01S 19/25* (2010.01)
*G01S 19/28* (2010.01)

(52) U.S. Cl.
CPC ............ *G01S 19/29* (2013.01); *G01S 19/254* (2013.01); *G01S 19/28* (2013.01)

(58) Field of Classification Search
CPC .. G01S 19/28–29; G01S 19/254; G01S 19/37; G01S 19/34; G01S 19/26
See application file for complete search history.

(56) References Cited

U.S. PATENT DOCUMENTS 5,418,538 A    5/1995  Lau
5,726,893 A    3/1998  Schuchman et al.
6,114,992 A    9/2000  Underbrink
8,026,847 B2*  9/2011  Pon ......................... G01S 19/28
                                                  342/357.69
2004/0162084 A1  8/2004  Wang
2008/0018531 A1  1/2008  Matsumoto
2011/0298662 A1  12/2011 Pon

OTHER PUBLICATIONS

European Patent Office, "Extended European Search Report from EP Application No. 18175862.4 dated Nov. 19, 2018", "from Foreign Counterpart of U.S. Appl. No. 15/624,569", filed Nov. 19, 2019, pp. 1-8, Published in: EP.

* cited by examiner

*Primary Examiner* — Cassi J Galt
(74) *Attorney, Agent, or Firm* — Fogg & Powers LLC

(57) ABSTRACT

A method of global navigation satellite system (GNSS) acquisition comprises: computing a line of sight (LOS) angle between a LOS vector of a first satellite and a LOS vector of a second satellite, wherein each LOS vector is the LOS vector between a receiver and the respective satellite; computing a maximum Doppler difference, wherein the maximum Doppler difference is computed between the first satellite and the second satellite based on the LOS angle and a maximum velocity vector attainable by the receiver, wherein Doppler is induced at least by movement of the receiver; determining a final frequency search range based on the maximum Doppler difference computed between the first satellite and the second satellite, wherein the frequency search range includes a center frequency equal to the first frequency at which the first satellite is found; acquiring a GNSS signal from the second satellite at a second frequency.

16 Claims, 7 Drawing Sheets

REDUCING FREQUENCY SEARCH SPACE FOR GLOBAL NAVIGATION SATELLITE SYSTEM ACQUISTION

BACKGROUND

One of the functions of a Global Navigation Satellite System (GNSS) receiver is to perform "acquisition." That is, its acquisition unit is responsible for finding which GNSS signals are visible to the receiver and estimating the frequency shift and code delay of those signals in order to track them. To find these signals and determine their frequency shift and code delay the acquisition unit has to go through the frequency and code search space.

In general, the larger the search space, the longer it takes to acquire a signal. The frequency search space typically depends on how large the frequency shift can be. The frequency shift of the received signal, with respect to the signal nominal frequency can be caused by different factors: Doppler induced by the satellite movement with respect to the receiver, Doppler induced by the receiver movement, and the frequency shift caused by the clock used in the receiver.

Conventionally, when a receiver has information about its current position and the current time as well as valid almanac data, it can use this information to predict which satellites will be visible and to estimate Doppler induced by satellites. This allows the acquisition function to search only for the visible satellites and reduces the frequency search space to an extent. Such an acquisition is known as acquisition with initialization.

Standards for aviation GNSS receivers define specific requirements regarding the maximum time the receiver has to perform the first position fix when an acquisition with initialization is performed. This, in turn, imposes limits on the time required to acquire the initial 5 satellites (needed to obtain a position fix with integrity) by the acquisition function. When GNSS signals have increased code lengths and modulations with narrower autocorrelation functions the total search space increases.

For the reasons stated above and for other reasons stated below, it will become apparent to those skilled in the art upon reading and understanding the specification, there is a need in the art for methods and systems to reduce the frequency search space and speed up the acquisition process.

SUMMARY

A method of global navigation satellite system (GNSS) acquisition is provided. The method comprises computing at least one line of sight (LOS) angle, wherein the LOS angle is an angle between a line of sight (LOS) vector of a first satellite of a plurality of satellites and a line of sight vector of a second satellite of the plurality of satellites, wherein each line of sight vector is the line of sight vector between a receiver and the respective satellite of the plurality of satellites, and wherein the first satellite is found previous to finding the second satellite at a first frequency. The method further comprises computing at least one maximum Doppler difference, wherein the maximum Doppler difference is a maximum Doppler difference computed between the first satellite and the second satellite of the plurality of satellites based on the LOS angle and a maximum velocity vector attainable by the receiver, wherein Doppler is induced at least by movement of the receiver. The method also comprises determining a final frequency search range based on the at least one maximum Doppler difference computed between the first satellite and the second satellite, wherein the frequency search range includes a center frequency equal to the first frequency at which the first satellite is found. Finally, the method comprises acquiring a GNSS signal from the second satellite at a second frequency.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
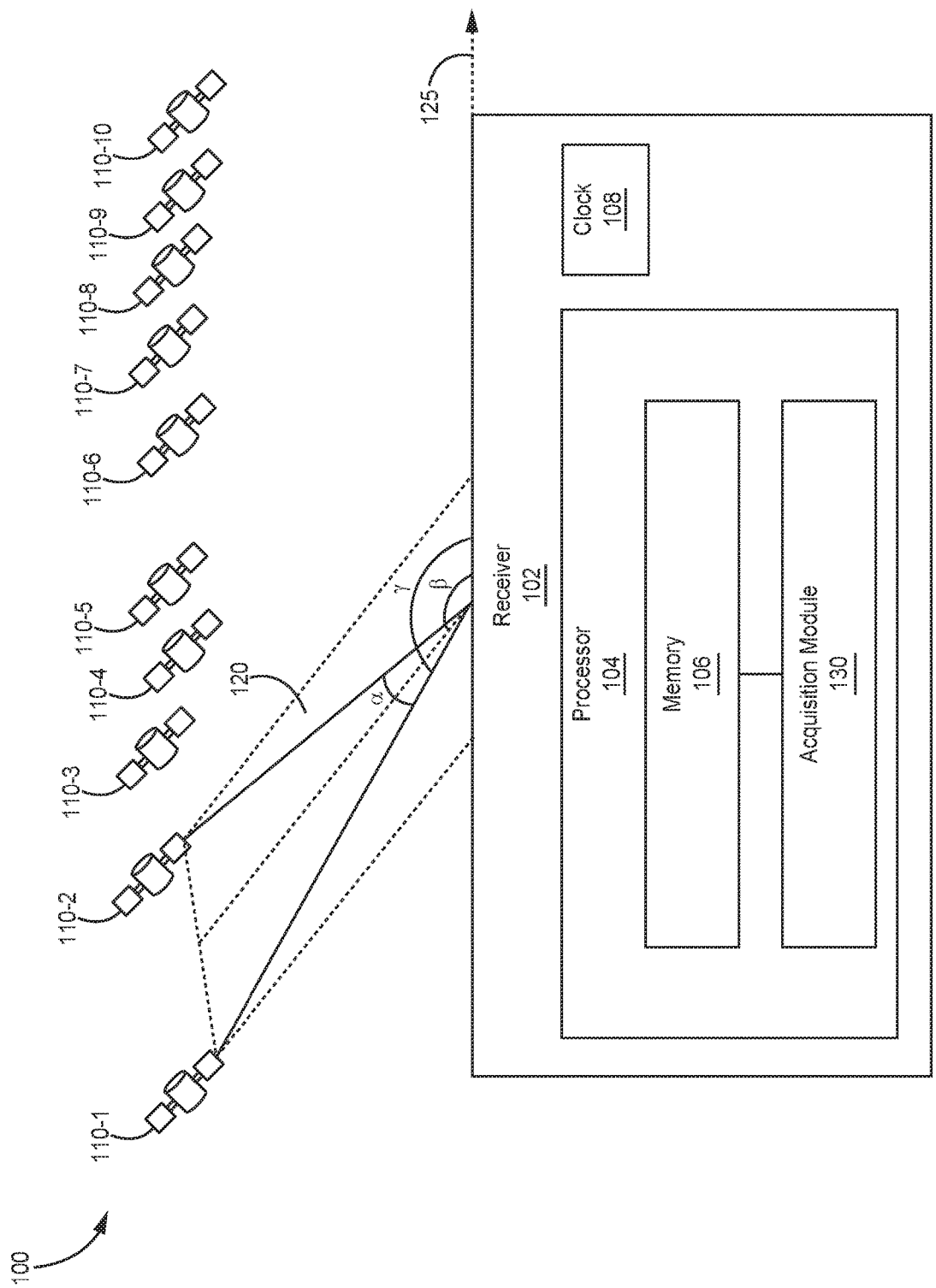
FIG. 1A-1C are block diagrams of an exemplary GNSS system for acquisition of GNSS signals.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments of the present description provide systems and methods for improving acquisition performance of a GNSS receiver. Specifically, as disclosed by the specification below, reducing the frequency search space reduces the time taken by the GNSS receiver for acquisition. Although it is contemplated that the embodiments described herein may be implemented in an aircraft, it is explicitly intended that these embodiments are not limited to an aircraft but may include other applications of a GNSS receiver, such as the one described herein.

FIG. 1A is a block diagram of example system 100 used in acquisition of signals from a plurality of satellites 110. The plurality of satellites 110 are in view of global navigation solution system (GNSS) receiver 102. In exemplary embodiments, the plurality of satellites 110 can include satellites from more than one constellation, such as GPS, GLONASS, Galileo, BeiDou, etc. In exemplary embodiments, the plurality of satellites 110 can be from a single constellation. GNSS receiver 102 is configured to receive signals from at least one of the plurality of satellites 110.

In exemplary embodiments, receiver 102 is included in a vehicle, such as an aircraft, land-based or sea-based vehicle. Receiver 102 includes at least one processor 104 that processes the signals received from the plurality of satellites 110. Processor 104 may be configured to execute code to implement an acquisition module 130. The acquisition module 130 is configured to determine the GNSS signals that are visible to receiver 102 and define possible range of uncertainty in frequency shift and code delay of one or more signals received from that satellite 110. In an example, memory 106 is included in or coupled to processor 104. Memory 106 can be used to store data as discussed below. In some exemplary embodiments, acquisition module 130 is stored in or coupled to memory 106.

A frequency shift of the received signal from one or more satellites 110 can be caused based on different factors: Doppler induced by the movement of satellite 110 with respect to the receiver 102, Doppler induced by movement of receiver 102, and the frequency shift caused by clock 108 included in receiver 102. The acquisition module 130 is configured to estimate and compensate for the Doppler induced by the satellite movement based on the information received by the receiver 102. That is, by estimating the shift due to the induced Doppler, receiver 102 can be configured to adjust its frequency for a respective satellite at a designated center frequency as if there were no Doppler shift.

Receiver 102 searches for a first satellite 110-1 and determines the frequency at which the signals from first satellite 110-1 are received. This frequency at which signals are received from satellite 110-1 may be stored in memory 106 for later retrieval. The frequency shift induced by receiver clock 108 is common to all satellites 110 visible to receiver 102. Accordingly, after the first satellite 110-1 is found by receiver 102 at a specific frequency, acquisition module 130 uses this frequency as an initial estimation of the Doppler induced by receiver clock 108.

Further, acquisition module 130 is configured to estimate the frequency uncertainty due to dynamics of receiver 102 for subsequent satellites 110 after first satellite 110-1 is located at a specific frequency based on an angle α between line of sight (LOS) vector of first satellite 110-1 and at least one second satellite from the plurality of satellites 110 and a maximum Doppler difference between first satellite 110-1 and the second satellite that is to be searched.

In exemplary embodiments, the maximum Doppler difference is based on maximum velocity possible for receiver 102 (for the case of aviation receivers is this defined in the standards) and the geometry between first satellite 110-1 and a second satellite (110-2). That is, the magnitude of the maximum Doppler is based on the maximum speed that the system including receiver 102 can travel at. In example embodiments, aircraft including receiver 102 can travel at speeds up to 800 knots; that is, 411 m/s. In such an example, when the velocity vector is aligned with the LOS vector between receiver 102 and second satellite 110-2, the maximum Doppler that can be induced is up to ±2163 Hz for GPS L1 signals. The frequency that the maximum Doppler can be induced up to will be different for GPS L5 signals and other signals having different carrier frequencies.

In example embodiments (for example, see FIGS. 1A-1C), the orientation of the velocity vector 125 is defined by the angle β between the velocity vector 125 and the plane 120 formed by the LOS vectors of the two satellites, and by the angle γ between the velocity vector 125 and the LOS vector to the first satellite 110-1. The values for angle β and γ maximizing the Doppler can be defined by the following equations:

$$\beta = 0 \tag{1}$$

$$\gamma = \frac{\alpha}{2} + \frac{3}{2}\pi \tag{2}$$

The maximum Doppler difference between the two satellites can then be computed as:

$$\text{Max Doppler } \textit{Diff} = \pm 2(\text{Max Doppler}) * \sin\frac{\alpha}{2} \tag{3}$$

where maximum Doppler difference is a positive or negative product of twice the maximum Doppler and a sine of half of the angle α between line of sight (LOS) vector of first satellite 110-1 and at least one a second satellite, such as satellite 110-2, from the plurality of satellites 110.

Processor 104 then determines the frequency search range for the second satellite 110-2 as the maximum Doppler difference with center frequency equal to the frequency at which the first satellite 110-1 is found. For example, if first satellite 110-1 is found at a frequency of 1000 Hz and the maximum Doppler difference is 500 Hz, the frequency search range for the second satellite 110-2 is determined as 1000 Hz±500 Hz. Accordingly, the frequency search range for the second satellite 110-2 is determined from 500 Hz to 1500 Hz.

In exemplary embodiments, receiver 102 is configured to search for signals received from second satellite within the determined frequency search range. In exemplary embodiments, the frequency at which signals from second satellite are received is saved in memory 106.

Figure 1B:
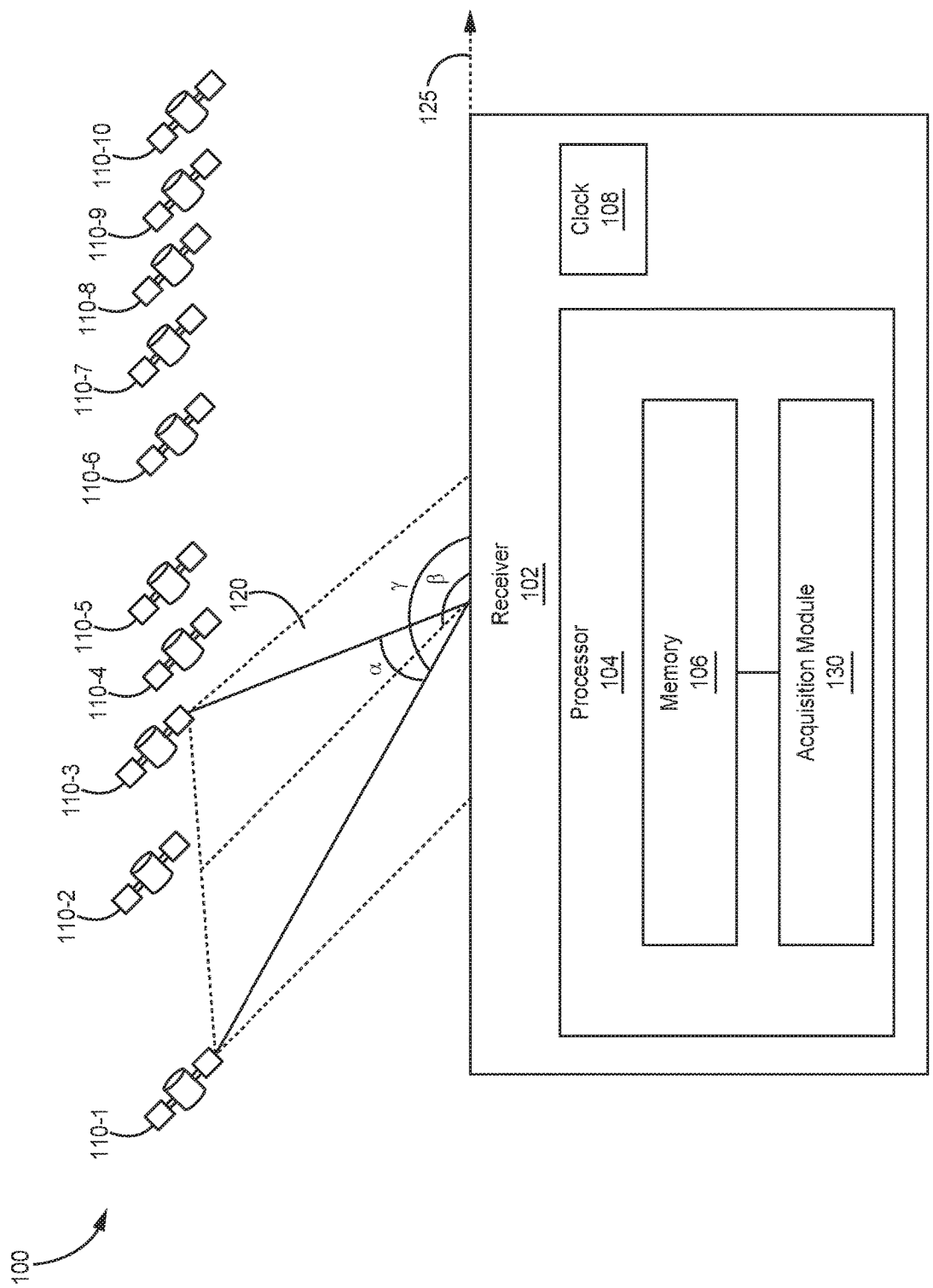
Figure 1C:
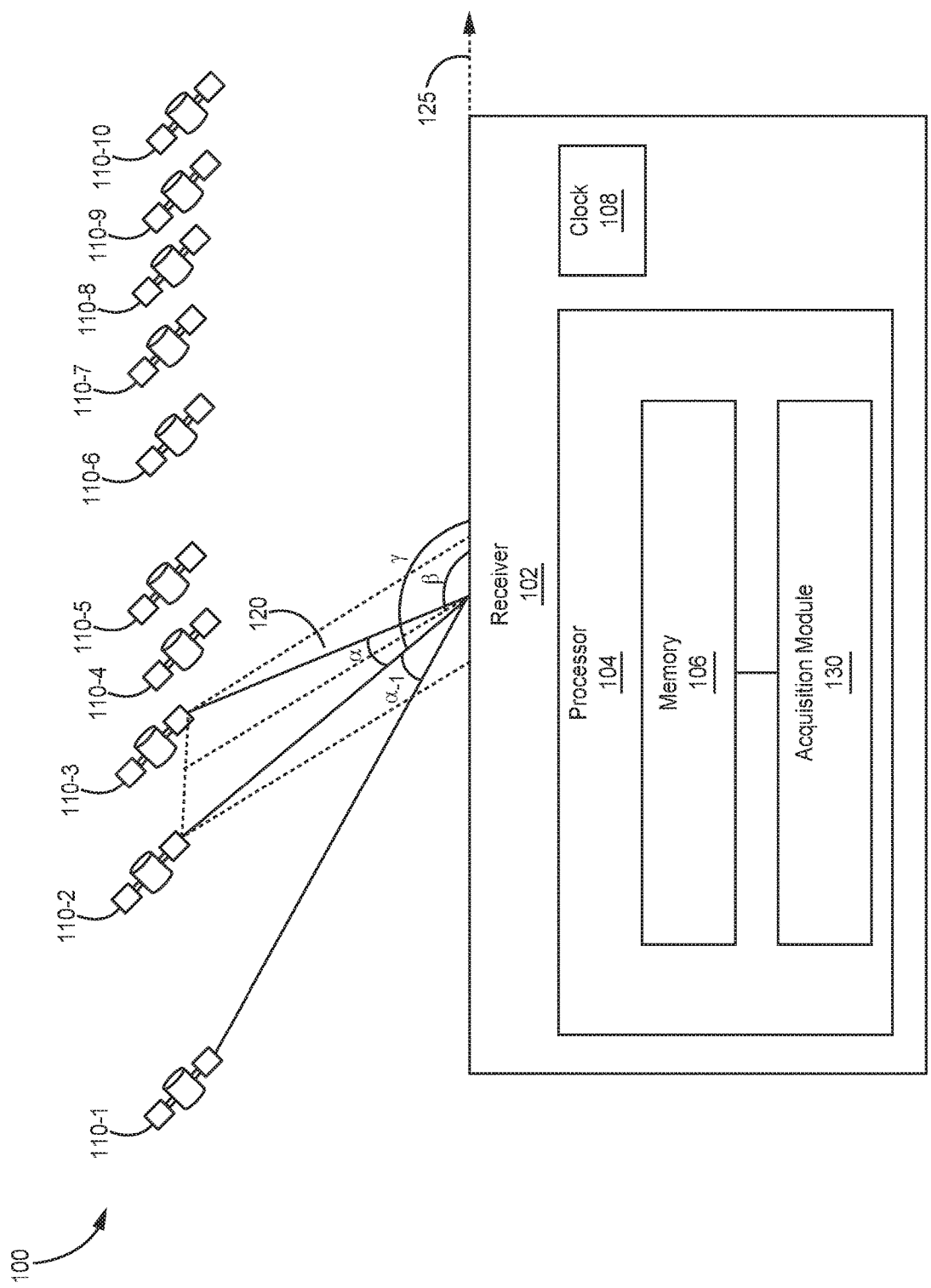

In exemplary embodiments, acquisition module 130 can locate a third satellite 110-3 at a specific frequency by computing a maximum Doppler difference between satellites 110-2 and 110-3 with center frequency equal to the frequency at which satellite 110-2 is found (See FIG. 1C). As shown in FIG. 1B, in some exemplary embodiments, acquisition module 130 is configured to always use center frequency equal to the frequency at which satellite 110-1 is found. That is, in some example embodiments, even after satellite 110-2 is located at a specific frequency, acquisition module 130 computes a maximum Doppler difference between satellites 110-1 and 110-3 with center frequency equal to the frequency at which satellite 110-1 is found.

In some exemplary embodiments, acquisition module 130 is configured to compute an angle α between the satellite to be searched and all satellites previously located by receiver 102 at specific frequencies. For example, in the example shown in FIG. 2, receiver 102 has previously located satellites 110-1, 110-2, 110-3, 110-4, 110-5 and 110-6 at specific frequencies respectively. To determine a frequency search range for satellite 110-7, acquisition module 130 computes angle $\alpha_1$ between the LOS vector to satellite 110-1 and LOS vector to satellite 110-7, angle $\alpha_2$ between the LOS vector to satellite 110-2 and LOS vector to satellite 110-7, angle $\alpha_3$ between the LOS vector to satellite 110-3 and LOS vector to satellite 110-7, angle $\alpha_4$ between the LOS vector to satellite 110-4 and LOS vector to satellite 110-7, angle $\alpha_5$ between the LOS vector to satellite 110-5 and LOS vector to satellite 110-7, and angle $\alpha_6$ between the LOS vector to satellite 110-6 and LOS vector to satellite 110-7.

Acquisition module 130 is further configured to determine the smallest angle from $\alpha_1$, $\alpha_2$, $\alpha_3$, $\alpha_4$, $\alpha_5$, and $\alpha_6$. The acquisition module 130 uses the satellite providing the smallest angle to compute a maximum Doppler difference based on Equation 3. In the example shown in FIG. 2, the smallest angle is $\alpha_6$. Accordingly, acquisition module 130 defines frequency search range as maximum Doppler difference with center frequency equal to the frequency at which satellite 110-6 was found.

Figure 2:
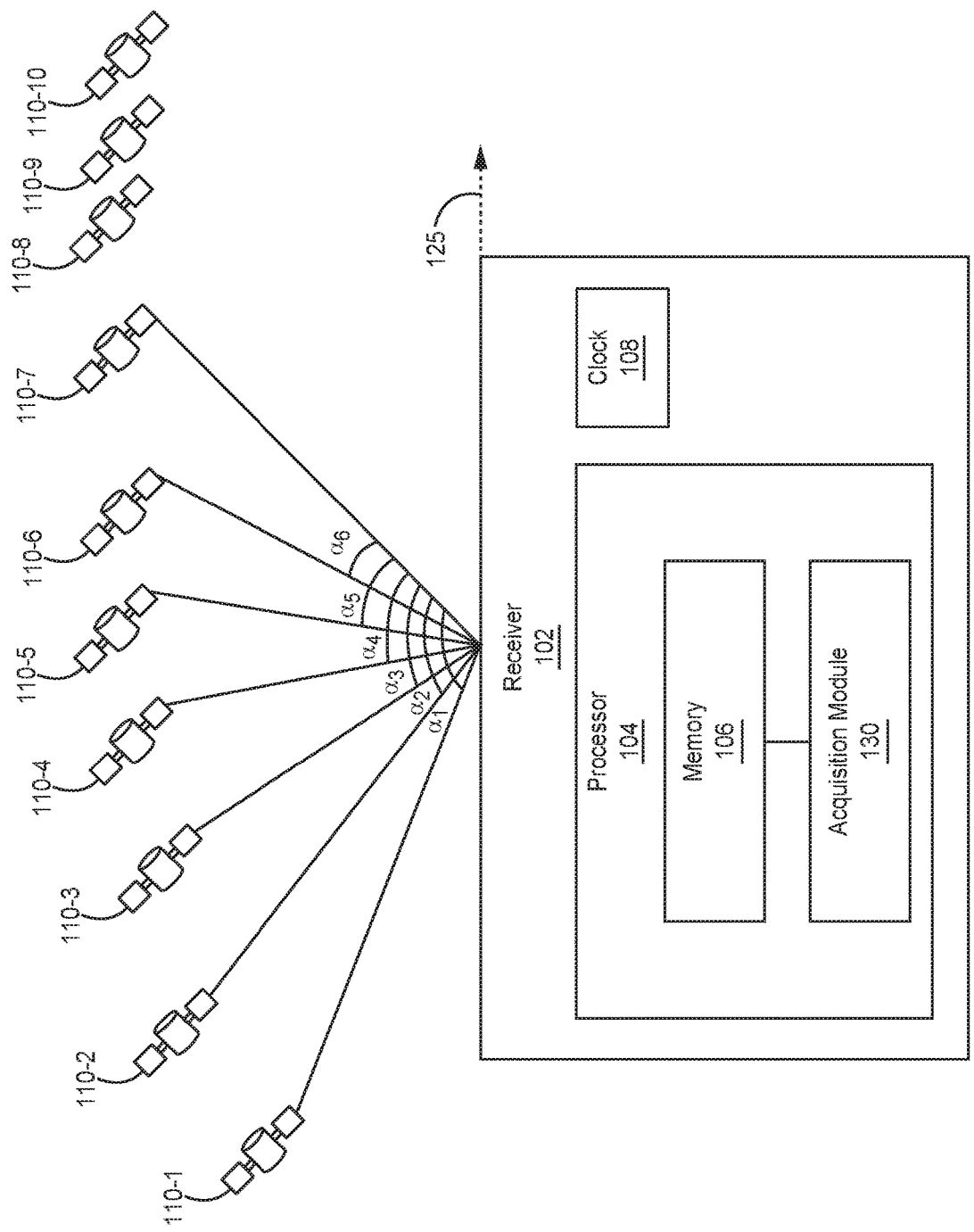
FIG. 2 is block diagram of another exemplary GNSS system for acquisition of GNSS signals.

In some exemplary embodiments, after computing angles $\alpha_1$, $\alpha_2$, $\alpha_3$, $\alpha_4$, $\alpha_5$, and $\alpha_6$ as shown in FIG. 2, acquisition module 130 is further configured to compute maximum Doppler differences between the satellite 110-7 that is to be searched and all previously located satellites 110-1, 110-2, 110-3, 110-4, 110-5 and 110-6 at specific frequencies respectively based on Equation 3. Computation of maximum Doppler difference for each pair of satellites assumes that the velocity vector has the largest magnitude and worst orientation. Acquisition module 130 is further configured to determine a plurality of frequency search ranges based on computed maximum Doppler differences between satellite 110-7 and all previously located satellites 110-1, 110-2, 110-3, 110-4, 110-5, and 110-6 at specific frequencies, with the center frequency equal to the frequency at which each respective satellite 110-1, 110-2, 110-3, 110-4, 110-5 and 110-6 was found.

The acquisition module 130 is further configured to determine an intersection range common to all of the frequency search ranges determined. For example, if the maximum Doppler difference between satellite 110-7 and satellite 110-1 is 500 Hz and satellite 110-1 is found at a frequency of 1000 Hz, the first frequency search range would be 500 Hz to 1500 Hz; if the maximum Doppler difference between satellite 110-7 and satellite 110-2 is 300 Hz and satellite 110-2 is found at a frequency of 500 Hz, the second frequency search range would be 200 Hz to 800 Hz; and, thus, the intersection range common to the first and second frequency search range is 500 Hz to 800 Hz. The acquisition module 130 determines an intersection range common to all of the frequency search ranges in a similar manner. Accordingly, the intersection range further narrows the final frequency search range within which satellite 110-7 is to be located.

In exemplary embodiments, the frequency search range can be narrowed further by selecting satellites to be searched in a manner that minimizes the angles between them. For example, an LOS angle for each pair of satellites from the plurality of satellites that are visible to the GNSS receiver is computed. A sum of LOS angles for one or more combination of four or five satellites from the plurality of satellites is then determined. The combination of satellites that have the smallest computed sum of angles between them is determined, and one of the satellites from the determined combination is selected as a first satellite and one of the satellites from the determined combination is selected as a second satellite. The frequency search range within which a satellite from determined combination is located can then be determined.

Figure 3:
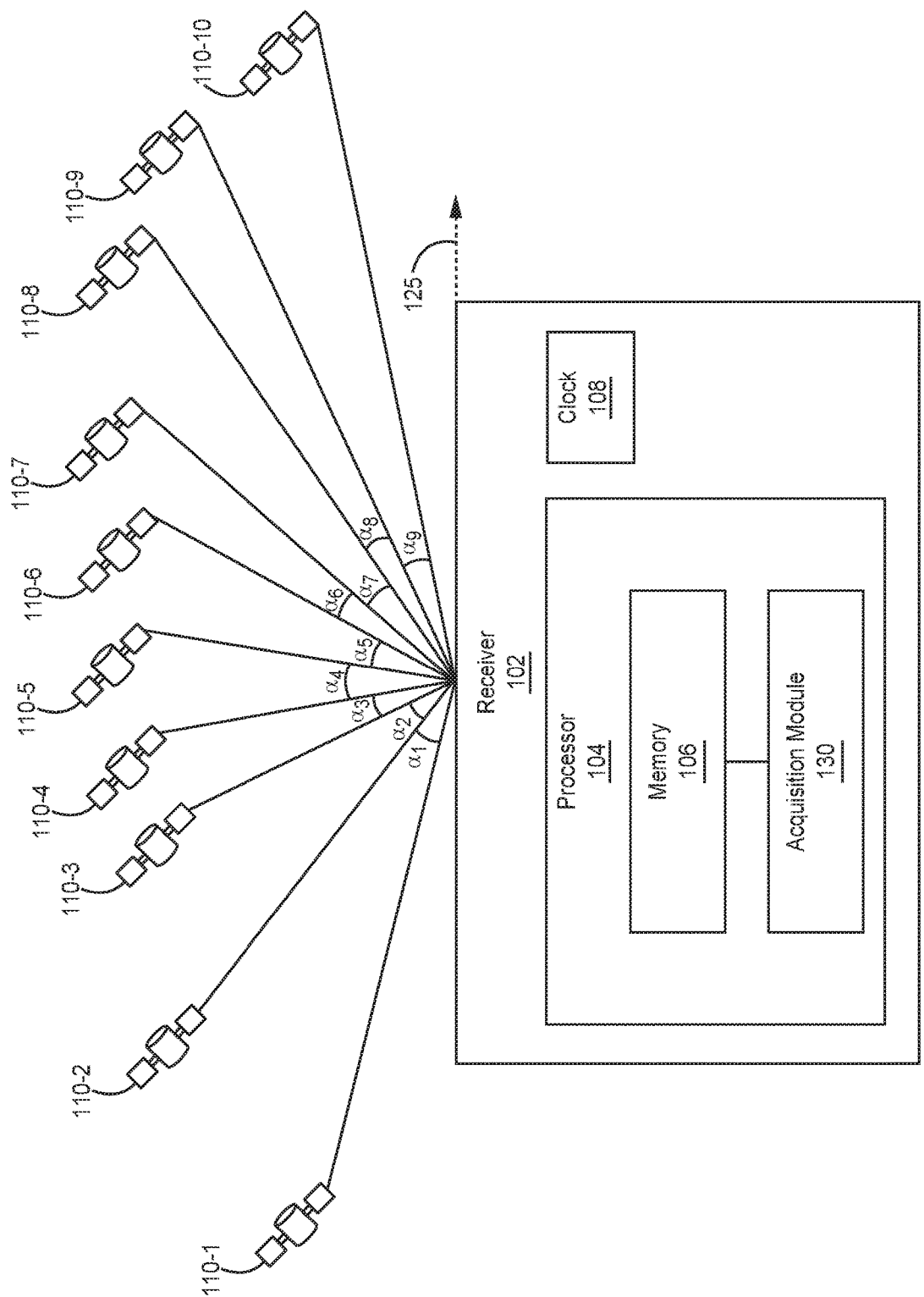
FIG. 3 is a block diagram of yet another exemplary GNSS system for acquisition of GNSS signals.

For example, in the example shown in FIG. 3, the sum of angles $\alpha_3$, $\alpha_4$, $\alpha_5$, and $\alpha_6$ corresponding to a subset of satellites including satellites 110-3, 110-4, 110-5, and 110-6 is smaller than any other subset of satellites formed (such as $\alpha_1$, $\alpha_2$, $\alpha_3$, $\alpha_4$ corresponding to a subset of satellites including satellites 110-1, 110-2, 110-3, 110-4, and 110-5, $\alpha_5$, $\alpha_6$, $\alpha_7$, and $\alpha_8$ corresponding to 110-5, 110-6, 110-7, 110-8, and 110-9 and/or any other possible combinations) from a plurality of satellites visible to GNSS receiver 102. Accordingly, in such an example, acquisition module 130 is configured to select the five satellites (110-3, 110-4, 110-5, 110-6 and 110-7) corresponding to angles $\alpha_3$, $\alpha_4$, $\alpha_5$, and $\alpha_6$ to perform acquisition. Acquisition module 130 may then use any of the processes disclosed herein to determine the frequency search range within which a satellite from the five selected satellites is located.

The functions and processes performed by processor 104 can be implemented using software, firmware, hardware, or any appropriate combination thereof, as known to one of skill in the art. These may be supplemented by, or incorporated in, specially-designed application specific integrated circuits (ASICs) or field programmable gate arrays (FPGAs). The processing device 104 can also include functions with software programs, firmware, or other computer readable instructions for carrying out various process tasks, calculations, and control functions used in the present embodiments.

The memory device 106 can be any appropriate tangible and non-transitory processor readable medium used for storage of processor readable instructions or data structures. Suitable processor readable media can include tangible media such as magnetic or optical media. For example, tangible media can include physical devices such as, but not limited to a conventional hard disk, compact disk (e.g., read only or re-writable), volatile or non-volatile media such as random access memory (RAM) including, but not limited to, synchronous dynamic random access memory (SDRAM), double data rate (DDR) RAM, RAMBUS dynamic RAM (RDRAM), static RAM (SRAM), etc.), read only memory (ROM), electrically erasable programmable ROM (EEPROM), and flash memory, etc.

Figure 4:
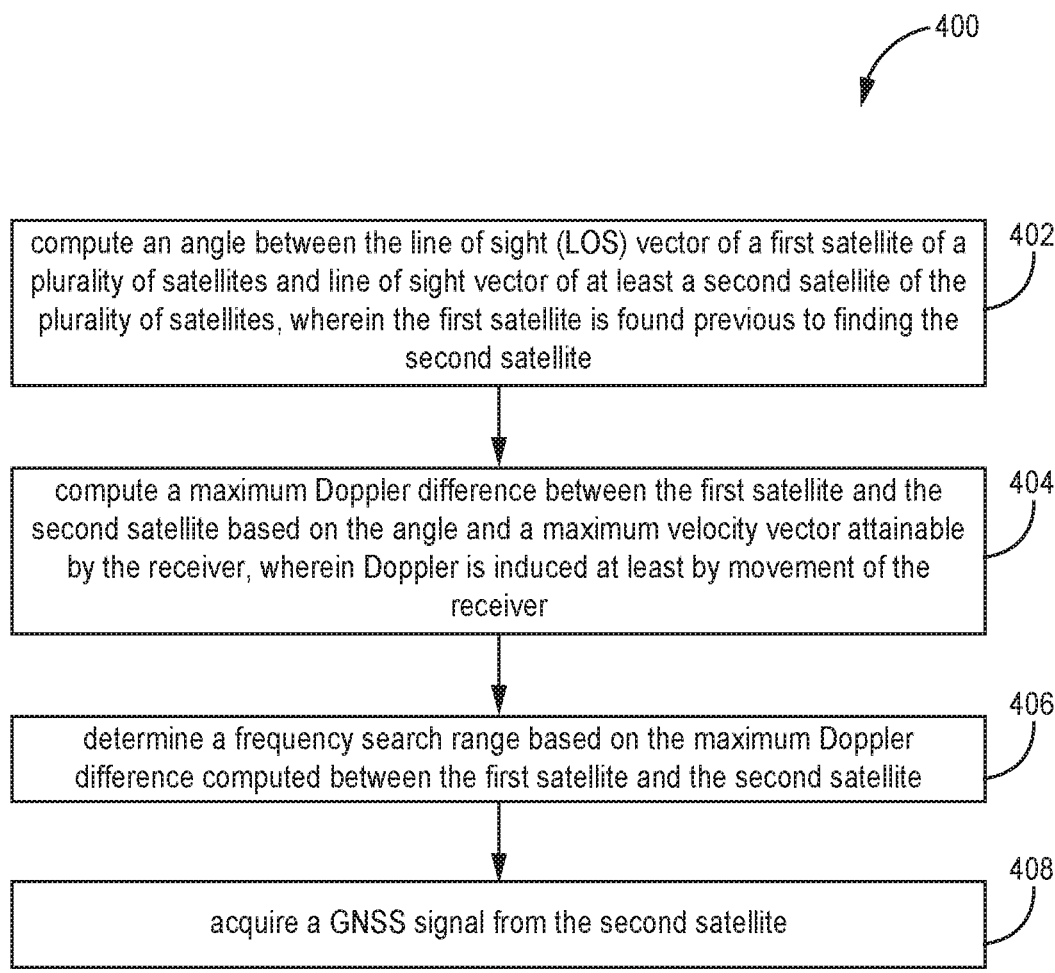
FIG. 4 is a flow diagram of an exemplary method to perform acquisition of GNSS signals.

FIG. 4 is a flow diagram of an example method 400 for acquisition of Global Navigation Satellite System (GNSS) signals. It should be understood that method 400 may be implemented in conjunction with any of the various embodiments and implementations described in this disclosure with respect to FIGS. 1A-3. As such, elements of method 400 may be used in conjunction with, in combination with, or substituted for elements of those embodiments.

Method 400 begins at block 402 with computing at least one line of sight (LOS) angle. The LOS angle is defined as an angle between the line of sight (LOS) vector of a first satellite, such as satellite 110-1 from a plurality of satellites and line of sight vector of a second satellite, such as satellite 110-2 of the plurality of satellites, and the first satellite is found at a specific frequency prior to finding the second satellite. The line of sight vector is the line of sight vector between a receiver, such as a receiver 102, and the respective satellite. In one example embodiment of method 400, computing at least one LOS angle further comprises computing a plurality of angles between the LOS vector of the second satellite and the LOS vectors of each of the satellites of the plurality of satellites that are found previous to finding the second satellite. In further examples of such an embodiment, method 400 comprises selecting the satellite having the smallest angle to the first satellite and estimate the frequency search range for finding the satellite. In further examples of such an exemplary embodiment, the frequency at which the first satellite is located is used as the central frequency to determine the final frequency search range for finding another satellite.

Method 400 proceeds to block 404 with computing at least one maximum Doppler difference. The maximum Doppler difference is a maximum Doppler difference computed between the first satellite and the second satellite based on the LOS angle and a maximum velocity vector attainable by the receiver. The maximum Doppler difference can be computed using Equation 3 and at least part of the maximum Doppler difference is Doppler induced by movement of the receiver. In some exemplary embodiments of method 400, computing at least one maximum Doppler difference further comprises computing a plurality of maximum Doppler differences between the second satellite and each of the satellites of the plurality of satellites that are found previous to finding the second satellite.

Method 400 then proceeds to block 406 with determining a final frequency search range based on the maximum Doppler difference computed between the first satellite and the second satellite. The final frequency search range includes a center frequency equal to the first frequency at which the first satellite is found. The final frequency search range is from a frequency equal to the central frequency minus the maximum Doppler difference to a frequency equal to the central frequency plus the maximum Doppler difference.

In some example embodiments of method 400, determining a final frequency search range further includes determining a plurality of individual frequency search ranges based on a plurality of maximum Doppler differences, wherein each individual frequency search range includes a center frequency equal to the frequency at which the respective satellite from the plurality of satellites was found. Such an example further includes determining an intersection range. The intersection range is a common frequency range that is included in each individual frequency search range of the plurality of frequency search ranges. This intersection range is then selected as final frequency search range.

Finally, method 400 proceeds to block 408 with acquiring a GNSS signal from the second satellite at a second frequency. In exemplary embodiments, method 400 further comprises storing the second frequency at which second satellite signal is found in a memory, such as memory 106. In exemplary embodiments, the plurality of satellites can include satellites from multiple constellations.

In some examples, method 400 further comprises acquiring a third satellite signal at a third frequency. In some exemplary embodiments, the frequency search range for the third satellite signal can be determined by computing an angle between the line of sight (LOS) vector of the first satellite, such as satellite 110-1 and line of sight vector of a third satellite, such as satellite 110-3 of the plurality of satellites, wherein the first satellite is found previous to the third satellite at a first frequency, computing a second maximum Doppler difference between the first satellite and the third satellite based on the angle and a maximum velocity vector attainable by the receiver, wherein Doppler is induced at least by movement of the receiver and determining a second frequency search range based on the second maximum Doppler difference computed between the first satellite and the third satellite, wherein the frequency search range includes a center frequency equal to the first frequency at which the first satellite is found Alternatively, in some examples, the frequency search range for a third satellite signal is determined based on the data obtained for the second satellite located at the second frequency by computing an angle between the line of sight (LOS) vector of the second satellite and line of sight vector of a third satellite of the plurality of satellites, wherein the second satellite is found previous to the third satellite at a second frequency, computing a second maximum Doppler difference between the second satellite and the third satellite based on the angle and a maximum velocity vector attainable by the receiver, wherein Doppler is induced at least by movement of the receiver, and determining a second frequency search range based on the second maximum Doppler difference computed between the second satellite and the third satellite, wherein the frequency search range includes a center frequency equal to the second frequency at which the second satellite is found.

Figure 5:
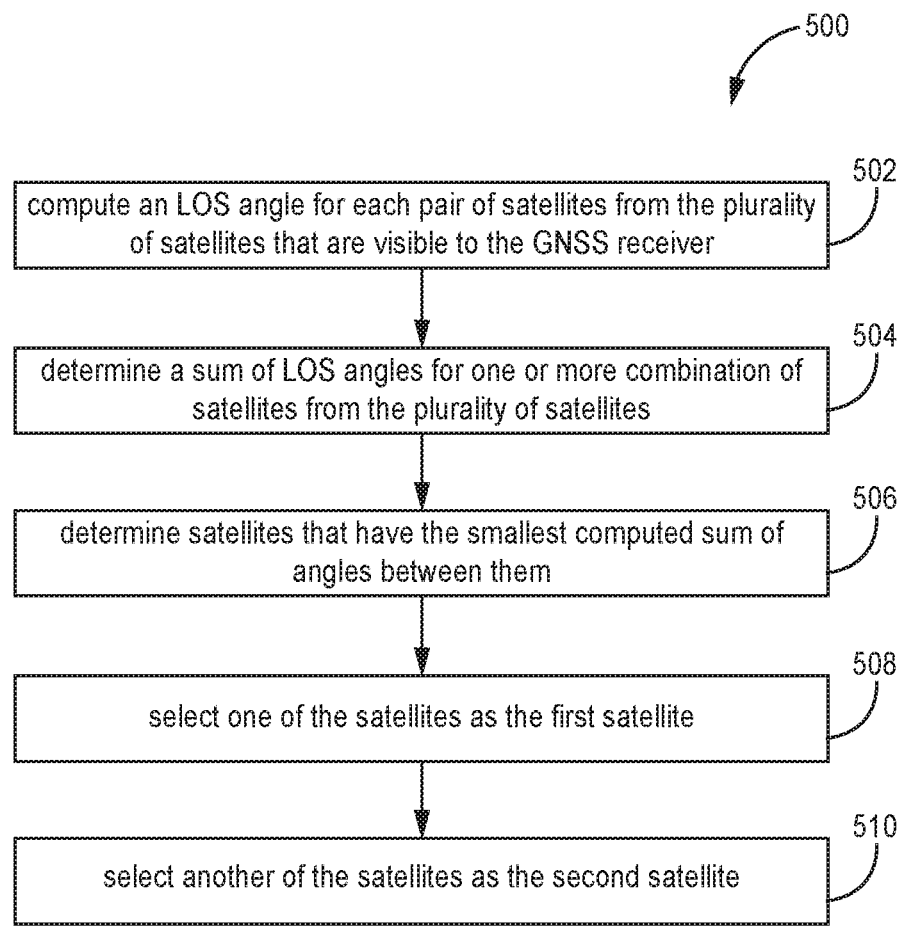
FIG. 5 is a flow diagram of an exemplary method to perform acquisition of GNSS that may be implemented with the exemplary method of FIG. 4.

FIG. 5 is a flow diagram of an example method 500 for acquisition of Global Navigation Satellite System (GNSS) signals. In exemplary embodiments, method 500 can be implemented with method 400 for further reducing frequency search range. It should be understood that method 500 may be implemented in conjunction with any of the various embodiments and implementations described in this disclosure with respect to FIGS. 1A-3. As such, elements of method 500 may be used in conjunction with, in combination with, or substituted for elements of those embodiments.

Method 500 begins at block 502 with computing an LOS angle for each pair of satellites from the plurality of satellites that are visible to the GNSS receiver. Method 500 then proceeds to block 504 with determining a sum of the LOS angles for one or more combination of satellites from the plurality of satellites. In exemplary embodiments, determining a sum of the LOS angles for the plurality of satellites includes determining a sum of the LOS angles for one or more combinations of five satellites from the plurality of satellites that are visible to the GNSS receiver. In exemplary embodiments, determining a sum of the LOS angles for the plurality of satellites includes determining a sum of the LOS angles for one or more combinations of four satellites from the plurality of satellites that are visible to the GNSS receiver. Conventional methods may be implemented to determine the sum of the combinations of satellites from the plurality of satellites.

Method 500 then proceeds to block 506 with determining the combination of satellites having the smallest computed sum of angles between them. In an example where the combination includes a combination of five satellites, the combination of five satellites having the smallest computed sum of angles between them is determined. In an example where the combination includes a combination of four satellites, the combination of four satellites having the smallest computed sum of angles between them is determined.

Method 500 then proceeds to block 508 with selecting one of the satellites from the combination having the smallest computed sum of angles between them as the first satellite. The acquisition for the first satellite is performed in a conventional manner. Method 500 then proceeds to block 510 with selecting another satellite from the combination having the smallest computed sum of angles between them as the second satellite. Any of the methods indicated herein can be performed to determine a frequency search range for the second satellite. For example, method 400 may now be implemented for acquisition of this second satellite.

EXAMPLE EMBODIMENTS

Example 1 includes a method of global navigation satellite system (GNSS) acquisition, the method comprising: computing at least one line of sight (LOS) angle, wherein the LOS angle is an angle between a line of sight (LOS) vector of a first satellite of a plurality of satellites and a line of sight vector of a second satellite of the plurality of satellites, wherein each line of sight vector is the line of sight vector between a receiver and the respective satellite of the plurality of satellites, and wherein the first satellite is found previous to finding the second satellite at a first frequency; computing at least one maximum Doppler difference, wherein the maximum Doppler difference is a maximum Doppler difference computed between the first satellite and the second satellite of the plurality of satellites based on the LOS angle and a maximum velocity vector attainable by the receiver, wherein Doppler is induced at least by movement of the receiver; determining a final frequency search range based on the at least one maximum Doppler difference computed between the first satellite and the second satellite, wherein the frequency search range includes a center frequency equal to the first frequency at which the first satellite is found; acquiring a GNSS signal from the second satellite at a second frequency.

Example 2 includes the method of Example 1, wherein computing at least one LOS angle further comprises: computing a plurality of LOS angles between the LOS vector of the second satellite of the plurality of satellites and the LOS vectors of each of the satellites of the plurality of satellites that are found previous to finding the second satellite; selecting the satellite of the plurality of satellites having the smallest angle to estimate the frequency search range for the second satellite.

Example 3 includes the method of any of Examples 1-2, further comprising: computing an angle between the line of sight (LOS) vector of a first satellite and line of sight vector of a third satellite of the plurality of satellites, wherein the first satellite is found previous to finding the third satellite at a first frequency; computing a second maximum Doppler difference between the first satellite and the third satellite of the plurality of satellites based on the angle and a maximum velocity vector attainable by the receiver, wherein Doppler is induced at least by movement of the receiver; determining a second frequency search range based on the second maximum Doppler difference computed between the first satellite and the third satellite of the plurality of satellites, wherein the frequency search range includes a center frequency equal to the first frequency at which the first satellite is found; and acquiring a GNSS signal from the third satellite at a third frequency.

Example 4 includes the method of any of Examples 1-3, further comprising: computing an angle between the line of sight (LOS) vector of the second satellite and line of sight vector of a third satellite of the plurality of satellites, wherein the second satellite is found previous to finding the third satellite at a second frequency; computing a second maximum Doppler difference between the second satellite and the third satellite of the plurality of satellites based on the angle and a maximum velocity vector attainable by the receiver, wherein Doppler is induced at least by movement of the receiver; determining a second frequency search range based on the second maximum Doppler difference computed between the second satellite and the third satellite of the plurality of satellites, wherein the frequency search range includes a center frequency equal to the second frequency at which the second satellite is found; and acquiring a GNSS signal from the third satellite at a third frequency.

Example 5 includes the method of any of Examples 1-4, wherein computing at least one LOS angle further comprises computing a plurality of angles between the LOS vector of the second satellite of the plurality of satellites and the LOS vectors of each of the other satellites of the plurality of satellites that are found previous to finding the second satellite; wherein computing at least one maximum Doppler difference further comprises computing a plurality of maximum Doppler differences between the second satellite and each respective one of the other satellites of the plurality of satellites that are found previous to finding the second satellite; wherein determining a final frequency search range based on the first maximum Doppler difference computed between the first satellite and the second satellite further comprises: determining a plurality of frequency search ranges based on the plurality of maximum Doppler differences, wherein each frequency search range includes a center frequency equal to the frequency at which the respective satellite from the plurality of satellites was found; determining an intersection range, wherein the intersection range is included in each frequency search range of the plurality of frequency search ranges; and selecting the intersection range as the final frequency search range.

Example 6 includes the method of any of Examples 1-5, wherein computing at least one LOS angle further comprises: computing an LOS angle for each pair of satellites from the plurality of satellites that are visible to the GNSS receiver; determining a sum of LOS angles for one or more combinations of five satellites from the plurality of satellites; determining the five satellites from the one or more combinations of five satellites that have the smallest computed sum of angles between them; selecting one of the five satellites as the first satellite; selecting another of the five satellites as the second satellite.

Example 7 includes the method of any of Examples 1-6, wherein computing at least one LOS angle further comprises: computing an LOS angle for each pair of satellites from the plurality of satellites that are visible to the GNSS receiver; determining a sum of LOS angles for one or more combinations of four satellites from the plurality of satellites; determining the four satellites from the one or more combinations of four satellites that have the smallest computed sum of angles between them; selecting one of the four satellites as the first satellite; selecting another of the four satellites as the second satellite.

Example 8 includes the method of any of Examples 1-7, wherein the plurality of satellites includes satellites from multiple constellations.

Example 9 includes a Global Navigation Satellite System (GNSS) receiver comprising: at least one processor, wherein the processor includes an acquisition module configured to: compute at least one line of sight (LOS) angle, wherein the LOS angle is an angle between a line of sight (LOS) vector of a first satellite of a plurality of satellites and a line of sight vector of a second satellite of the plurality of satellites, wherein each line of sight vector is the line of sight vector between a receiver and the respective satellite of the plurality of satellites, and wherein the first satellite is found previous to finding the second satellite at a first frequency; compute at least one maximum Doppler difference, wherein the maximum Doppler difference is a maximum Doppler difference computed between the first satellite and the second satellite of the plurality of satellites based on the LOS angle and a maximum velocity vector attainable by the receiver, wherein Doppler is induced at least by movement of the receiver; determine a final frequency search range based on the at least one maximum Doppler difference computed between the first satellite and the second satellite, wherein the frequency search range includes a center frequency equal to the first frequency at which the first satellite is found; acquire a GNSS signal from the second satellite at a second frequency.

Example 10 includes the system of Example 9, wherein to compute at least one LOS angle, the at least one processor is further configured to: compute a plurality of LOS angles between the LOS vector of the second satellite of the plurality of satellites and the LOS vectors of each of the satellites of the plurality of satellites that are found previous to finding the second satellite; and select the satellite of the plurality of satellites having the smallest angle to estimate the frequency search range for the second satellite.

Example 11 includes the system of any of Examples 9-10, wherein the at least one processor is further configured to: compute an angle between the line of sight (LOS) vector of a first satellite and line of sight vector of a third satellite, wherein the first satellite is found previous to finding the third satellite at a first frequency; compute a second maximum Doppler difference between the first satellite and the third satellite of the plurality of satellites based on the angle and a maximum velocity vector attainable by the receiver, wherein Doppler is induced at least by movement of the receiver; and determine a second frequency search range based on the second maximum Doppler difference computed between the first satellite and the third satellite of the plurality of satellites, wherein the frequency search range includes a center frequency equal to the first frequency at which the first satellite is found; acquire the third satellite at a third frequency.

Example 12 includes the system of any of Examples 9-11, wherein the at least one processor is further configured to: compute an angle between the line of sight (LOS) vector of the second satellite and line of sight vector of a third satellite, wherein the second satellite is found previous to finding the third satellite at a second frequency; compute a second maximum Doppler difference between the second satellite and the third satellite of the plurality of satellites based on the angle and a maximum velocity vector attainable by the receiver, wherein Doppler is induced at least by movement of the receiver; and determine a second frequency search range based on the second maximum Doppler difference computed between the second satellite and the third satellite of the plurality of satellites, wherein the frequency search range includes a center frequency equal to the second frequency at which the second satellite is found; acquire the third satellite at a third frequency.

Example 13 includes the system of any of Examples 9-12, further comprising a memory coupled to the at least one processor, wherein the processor is configured to store the second frequency at which second satellite is found in the memory.

Example 14 includes the system of any of Examples 9-13, wherein to compute at least one LOS angle, the at least one processor is further configured to compute a plurality of angles between the LOS vector of the second satellite of the plurality of satellites and the LOS vectors of each of the other satellites of the plurality of satellites that are found previous to finding the second satellite; wherein to compute at least one maximum Doppler difference, the at least one processor is further configured to compute a plurality of maximum Doppler differences between the second satellite and each respective one of the other satellites of the plurality of satellites that are found previous to finding the second satellite; wherein to determine a final frequency search range based on the first maximum Doppler difference computed between the first satellite and the second satellite, the at least one processor is further configured to: determine a plurality of frequency search ranges based on the plurality of maximum Doppler differences, wherein each frequency search range includes a center frequency equal to the frequency at which the respective satellite from the plurality of satellites was found; determine an intersection range, wherein the intersection range is included in each frequency search range of the plurality of frequency search ranges; and select the intersection range as the final frequency search range.

Example 15 includes the GNSS receiver of any of Examples 9-14, wherein to compute at least one LOS angle, the processor is further configured to: compute an LOS angle for each pair of satellites from the plurality of satellites that are visible to the GNSS receiver; determine a sum of LOS angles from one or more combinations of five satellites from the plurality of satellites; determine the five satellites from the one or more combinations of five satellites that have the smallest computed sum of angles between them; select one of the five satellites as the first satellite; select another of the five satellites as the second satellite.

Example 16 includes the GNSS receiver of any of Examples 9-15, wherein the GNSS receiver is configured to receive signals from one or more satellites from multiple constellations.

Example 17 includes a non-transitory computer-readable medium having computer-executable instructions stored thereon which, when executed by one or more processors, cause the one or more processors to: compute at least one line of sight (LOS) angle, wherein the LOS angle is an angle between a line of sight (LOS) vector of a first satellite of a plurality of satellites and a line of sight vector of a second satellite of the plurality of satellites, wherein each line of sight vector is the line of sight vector between a receiver and the respective satellite of the plurality of satellites, and wherein the first satellite is found previous to finding the second satellite at a first frequency; compute at least one maximum Doppler difference, wherein the maximum Doppler difference is a maximum Doppler difference computed between the first satellite and the second satellite of the plurality of satellites based on the LOS angle and a maximum velocity vector attainable by the receiver, wherein Doppler is induced at least by movement of the receiver; determine a final frequency search range based on the at least one maximum Doppler difference computed between the first satellite and the second satellite, wherein the frequency search range includes a center frequency equal to the first frequency at which the first satellite is found; acquire a GNSS signal from the second satellite at a second frequency.

Example 18 includes the non-transitory computer-readable medium of Example 17, wherein to compute at least one LOS angle, the instructions cause the at least one processor to: compute a plurality of LOS angles between the LOS vector of the second satellite of the plurality of satellites and the LOS vectors of each of the satellites of the plurality of satellites that are found previous to finding the second satellite; and select the satellite of the plurality of satellites having the smallest angle as the first satellite to determine the frequency search range.

Example 19 includes the non-transitory computer-readable medium of any of Examples 17-18, wherein to compute at least one LOS angle, the instructions cause the at least one processor to compute a plurality of angles between the LOS vector of the second satellite of the plurality of satellites and the LOS vectors of each of the other satellites of the plurality of satellites that are found previous to finding the second satellite; wherein to compute at least one maximum Doppler difference, the instructions cause the at least one processor to compute a plurality of maximum Doppler differences between the second satellite and each respective one of the other satellites of the plurality of satellites that are found previous to finding the second satellite; wherein to determine a final frequency search range based on the first maximum Doppler difference computed between the first satellite and the second satellite, the instructions cause the at least one processor to: determine a plurality of frequency search ranges based on the plurality of maximum Doppler differences, wherein each frequency search range includes a center frequency equal to the frequency at which the respective satellite from the plurality of satellites was found; determine an intersection range, wherein the intersection range is included in each frequency search range of the plurality of frequency search ranges; and select the intersection range as the final frequency search range.

Example 20 includes the non-transitory computer-readable medium of any of Examples 17-19, wherein the instructions cause the at least one processor to: compute an LOS angle for each pair of satellites from the plurality of satellites that are visible to the GNSS receiver; determine a sum of LOS angles for one or more combinations of five satellites from the plurality of satellites; determine the five satellites from the one or more combinations of five satellites that have the smallest computed sum of angles between them; select one of the five satellites as the first satellite; select another of the five satellites as the second satellite.

What is claimed is:

1. A method of global navigation satellite system (GNSS) acquisition, the method comprising:
    identifying a set of satellites including one or more acquired satellites and an unacquired satellite;
    computing at least one line of sight (LOS) angle, wherein the at least one LOS angle is an angle between a line of sight (LOS) vector of one of the one or more acquired satellites and a line of sight vector of the unacquired satellite, wherein each line of sight vector is determined based on at vector between a receiver and a respective one of the unacquired satellite or one of the one or more acquired satellites, and wherein each of the one or more acquired satellites is a satellite that has been acquired at an acquired frequency;
    computing at least one maximum Doppler difference, wherein each maximum Doppler difference is computed for a pair of satellites including one of the one or more acquired satellites paired with the unacquired satellite, respectively, based on a respective one of the at least one LOS angle and a maximum velocity vector attainable by the receiver, wherein Doppler is induced at least by movement of the receiver;
    determining a final frequency search range based on the at least one maximum Doppler difference, wherein the final frequency search range includes a center frequency equal to the acquired frequency of one of the one or more acquired satellites; and
    acquiring a GNSS signal from the unacquired satellite based on the final frequency search range.

2. The method of claim 1, wherein computing at least one LOS angle further comprises:
    computing a plurality of LOS angles between the LOS vector of the unacquired satellite and a respective LOS vector of each of the satellites of the one or more acquired satellites that are acquired previous to acquiring the unacquired satellite; and
    selecting the satellite of the one or more acquired satellites having the smallest LOS angle to estimate a frequency search range for the unacquired satellite.

3. The method of claim 1,
    wherein determining a final frequency search range based on the at least one maximum Doppler difference further comprises:
        determining a plurality of frequency search ranges based on a plurality of maximum Doppler differences, wherein each frequency search range includes a center frequency equal to the frequency at which the respective satellite from the one or more acquired satellites was acquired;
        determining an intersection range, wherein the intersection range is included in each frequency search range of the plurality of frequency search ranges; and
        selecting the intersection range as the final frequency search range.

4. The method of claim 1, wherein identifying a set of satellites including one or more acquired satellites and an unacquired satellite further comprises:
    computing a LOS angle for each pair of satellites from at least five satellites that are visible to the GNSS receiver;
    determining a sum of LOS angles for one or more combinations of five satellites from the at least five satellites;
    determining the five satellites from the one or more combinations of five satellites that have the smallest computed sum of angles between them;
    acquiring one of the five satellites as one of the acquired satellites; and
    selecting another of the five satellites as the unacquired satellite to be acquired.

5. The method of claim 1, wherein identifying a set of satellites including one or more acquired satellites and an unacquired satellite further comprises:
    computing a LOS angle for each pair of satellites from at least four satellites that are visible to the GNSS receiver;
    determining a sum of LOS angles for one or more combination of four satellites from the at least four satellites;
    determining the four satellites from the one or more combinations of four satellites that have the smallest computed sum of angles between them;
    acquiring one of the four satellites as one of the acquired satellites; and
    selecting another of the four satellites as the unacquired satellite to be acquired.

6. The method of claim 1, wherein the one or more acquired satellites includes satellites from multiple constellations.

7. A Global Navigation Satellite System (GNSS) receiver comprising:
    at least one processor, wherein the at least one processor is configured to run code that implements an acquisition module, the acquisition module configured to:
    identify a set of satellites including one or more acquired satellites and an unacquired satellite;
    compute at least one line of sight (LOS) angle, wherein the at least one LOS angle is an angle between a line of sight (LOS) vector of one of the one or more acquired satellites and a line of sight vector of the unacquired satellite, wherein each line of sight vector is determined based on a vector between the receiver and a respective one of the unacquired satellite or one of the one or more acquired satellites, and wherein each of the one or more acquired satellites is a satellite that has been acquired at an acquired frequency;
    compute at least one maximum Doppler difference, wherein each maximum Doppler difference is a maximum Doppler difference computed for a pair of satellites including one of the one or more acquired satellites paired with the unacquired satellite, respectively, based on a respective one of the at least one LOS angle and a maximum velocity vector attainable by the receiver, wherein Doppler is induced at least by movement of the receiver;
    determine a final frequency search range based on the at least one maximum Doppler difference, wherein the final frequency search range includes a center frequency equal to the acquired frequency of one of the one or more acquired satellites; and acquire a GNSS signal from the unacquired satellite based on the final frequency search range.

8. The GNSS receiver of claim 7, wherein to compute at least one LOS angle, the at least one processor is further configured to:
compute a plurality of LOS angles between the LOS vector of the unacquired satellite and the LOS vectors of each of the satellites of the one or more satellites that are acquired previous to acquiring the unacquired satellite; and
select the satellite of the one or more acquired satellites having the smallest angle to estimate the final frequency search range for the unacquired satellite.

9. The GNSS receiver of claim 7, further comprising a memory coupled to the at least one processor, wherein the at least one processor is configured to store a frequency at which the unacquired satellite is acquired in the memory.

10. The GNSS receiver of claim 7,
wherein to determine a final frequency search range based on the at least one maximum Doppler difference computed between one of the one or more acquired satellites and the unacquired satellite, the at least one processor is further configured to:
determine a plurality of frequency search ranges based on a plurality of maximum Doppler differences, wherein each frequency search range includes a center frequency equal to the frequency at which the respective satellite from the one or more acquired satellites was acquired;
determine an intersection range, wherein the intersection range is included in each frequency search range of the plurality of frequency search ranges; and
select the intersection range as the final frequency search range.

11. The GNSS receiver of claim 7, wherein to identify a set of satellites including one or more acquired satellites and an unacquired satellite, the at least one processor is further configured to:
compute a LOS angle for each pair of satellites from at least five satellites that are visible to the GNSS receiver;
determine a sum of LOS angles for one or more combinations of five satellites from the at least five satellites;
determine the five satellites from the one or more combinations of five satellites that have the smallest computed sum of angles between them;
acquire one of the five satellites as one of the acquired satellites; and
select another of the five satellites as the unacquired satellite to be acquired.

12. The GNSS receiver of claim 7, wherein the GNSS receiver is configured to receive signals from one or more satellites from multiple constellations.

13. A non-transitory computer-readable medium having computer-executable instructions stored thereon which, when executed by one or more processors, cause the one or more processors to:
identify a set of satellites including one or more acquired satellites and an unacquired satellite;
compute at least one line of sight (LOS) angle, wherein the at least one LOS angle is an angle between a line of sight (LOS) vector of one of the one or more acquired satellites and a line of sight vector of the unacquired satellite, wherein each line of sight vector is determined based on a vector between a receiver and a respective one of the unacquired satellite or one of the one or more acquired satellites, and wherein each of the one or more acquired satellites is a satellite that has been acquired at an acquired frequency;
compute at least one maximum Doppler difference, wherein each maximum Doppler difference computed for a pair of satellites including one of the one or more acquired satellites paired with the unacquired satellite, respectively, based on a respective one of the at least one LOS angle and a maximum velocity vector attainable by the receiver, wherein Doppler is induced at least by movement of the receiver;
determine a final frequency search range based on the at least one maximum Doppler difference computed between the first satellite and the second satellite, wherein the frequency search range includes a center frequency equal to the acquired frequency of one of the one or more acquired satellites; and
acquire a GNSS signal from the unacquired satellite based on the final frequency search range.

14. The non-transitory computer-readable medium of claim 13, wherein to compute at least one LOS angle, the instructions cause the at least one processor to:
compute a plurality of LOS angles between the LOS vector of the unacquired satellite and a respective LOS vector of each of the satellites of the plurality of acquired satellites that are acquired previous to acquiring the unacquired satellite; and
select the satellite of the plurality of acquired satellites having the smallest LOS angle as the first satellite to determine a final frequency search range.

15. The non-transitory computer-readable medium of claim 13,
wherein to determine a final frequency search range based on the at least one maximum Doppler difference computed between the first satellite and the unacquired satellite, the instructions cause the at least one processor to:
determine a plurality of frequency search ranges based on a plurality of maximum Doppler differences, wherein each frequency search range includes a center frequency equal to the frequency at which the respective satellite from the one or more acquired satellites was acquired;
determine an intersection range, wherein the intersection range is included in each frequency search range of the plurality of frequency search ranges; and
select the intersection range as the final frequency search range.

16. The non-transitory computer-readable medium of claim 13, wherein to identify a set of satellites including one or more acquired satellites and an unacquired satellite, the instructions cause the at least one processor to:
compute a LOS angle for each pair of satellites from at least five satellites that are visible to the GNSS receiver;
determine a sum of LOS angles for one or more combinations of five satellites from the at least five satellites;
determine the five satellites from the one or more combinations of five satellites that have the smallest computed sum of angles between them;
acquire one of the five satellites as one of the acquired satellites; and
select another of the five satellites as the unacquired satellite to be acquired.

* * * * *